(12) United States Patent
Preis

(10) Patent No.: US 7,787,822 B2
(45) Date of Patent: Aug. 31, 2010

(54) FM-JAM DEVICE AND KIT

(75) Inventor: Wayne M. Preis, 859 Agate St., San Diego, CA (US) 92109

(73) Assignee: Wayne M. Preis, San Diego, CA (US)

( * ) Notice: Subject to any disclaimer, the term of this patent is extended or adjusted under 35 U.S.C. 154(b) by 833 days.

(21) Appl. No.: 10/792,454

(22) Filed: Mar. 2, 2004

(65) Prior Publication Data
US 2004/0176030 A1 Sep. 9, 2004

Related U.S. Application Data

(60) Provisional application No. 60/451,974, filed on Mar. 3, 2003.

(51) Int. Cl.
*H04B 7/00* (2006.01)

(52) U.S. Cl. ...................... 455/41.2; 455/556.1; 84/610

(58) Field of Classification Search ............... 455/1, 455/91, 93, 130, 142, 95–99, 39, 41.2, 556.1; 84/601, 645, 29, 322, 723, 610
See application file for complete search history.

(56) References Cited

U.S. PATENT DOCUMENTS

| | | | | |
|---|---|---|---|---|
| 3,781,451 A | * | 12/1973 | Nolan | 84/723 |
| 3,825,666 A | * | 7/1974 | Jaggers | 84/672 |
| 4,099,437 A | * | 7/1978 | Stavrou et al. | 84/617 |
| 4,186,641 A | | 2/1980 | Dorfman | |
| 4,215,431 A | | 7/1980 | Nady | |
| 5,025,704 A | * | 6/1991 | Davis | 84/723 |
| 5,194,682 A | * | 3/1993 | Okamura et al. | 434/307 A |
| 5,422,955 A | | 6/1995 | Guzman et al. | |
| 5,576,507 A | | 11/1996 | LaMarra | |
| 5,584,051 A | * | 12/1996 | Goken | 455/68 |
| 5,606,143 A | * | 2/1997 | Young | 84/600 |
| 5,700,966 A | | 12/1997 | LaMarra | |
| 5,866,835 A | | 2/1999 | Baggs | |
| 5,946,604 A | | 8/1999 | Bailey | |
| 6,023,019 A | | 2/2000 | Baggs | |
| 6,025,553 A | * | 2/2000 | Lee | 84/610 |
| 6,328,570 B1 | * | 12/2001 | Ng | 434/307 A |
| 6,535,719 B1 | * | 3/2003 | Suzuki et al. | 455/112 |
| 7,129,468 B2 | * | 10/2006 | Ennes | 250/221 |
| 2002/0102000 A1 | * | 8/2002 | Tanaka | 381/77 |
| 2003/0045326 A1 | | 3/2003 | Bailey | |

* cited by examiner

*Primary Examiner*—Quochien B Vuong

(57) ABSTRACT

An FM-Jam device features a sonic character transformation module in combination with an FM transmitter module. The sonic character transformation module responds to an audio input signal from an audio source, including a guitar, keyboard or microphone, for providing a sonic character transformation module signal containing information about a transformation of the sonic character of the audio input signal. The FM transmitter module responds to the sonic character transformation module signal, for providing an FM transmitter output signal on a selected FM frequency for playing on any FM receiver, including a boom-box, car stereo, home stereo or the like. In one embodiment, the sonic character transformation module is a modeling/DSP preamp.

20 Claims, 3 Drawing Sheets

FM-JAM DEVICE AND KIT

This application claims the benefit of U.S. Provisional Application No. 60/451,974, filing date: Mar. 3, 2003.

BACKGROUND OF THE INVENTION

1. Field of Invention

The present invention relates to a device or a kit for playing a guitar, voice or other type of musical instrument; and more particularly to a portable device, kit or combination for playing a guitar or other instrument through an FM receiver.

2. Description of Related Art

Audio pre-amps and digital modeling pre-amps, including, Digitech RP-50, Zoom 505, Korg Pandora's Box, etc., are known in the art, are all portable device that operate using standard batteries, and function to amplify an audio signal from an audio source such as a guitar, keyboard (electric piano, synthesizer, etc.) or microphone (or any other device outfitted with any variety of transducers).

Moreover, transmitters, including FM-Transmitters like KIMA Link-It, Arielle Audio Bug, etc., are also known in the art and function to transmit a signal, such as an FM signal, input from a given audio source.

According to the understanding of the inventor, these two known and readily available devices have never been packaged as a single unit or sold commercially together in a package with an instruction sheet for configuring or using the same in the manner described below.

In view of this, there is a need in the art for a device for playing an audio source through an FM receiver, which is portable and easy to use.

SUMMARY OF INVENTION

In its broadest sense, the present invention provides an FM-Jam device featuring a sonic character transformation module in combination with an FM transmitter module. The sonic character transformation module responds to an audio input signal from an audio source, including a guitar, keyboard or microphone, for providing a sonic character transformation module signal containing information about a transformation of the sonic character of the audio input signal. The FM transmitter module responds to the sonic character transformation module signal, for providing an FM transmitter output signal on a selected FM frequency for playing on any FM receiver, including a boom-box, car stereo, home stereo or the like.

The sonic character transformation module may include a sound shaping analog or digital signal processor for providing some desired shaping of the sound characteristic of the audio input signal. In its broadest sense, the scope of the invention is intended to include taking an audio input signal and transforming it's sonic character through the use of either analog or digital circuitry. For example, the desired shaping may include modifying or adding either amplification, reverberation, equalization such as bass, midrange, treble, distortion, compression, vacuum tube modeling, overdrive and modulations such as chorusing, flanging, phasing etc. or some combination thereof, of the audio input signal. The sound shaping signal processor may be programmable by the user for selectively providing the desired shaping of the sound characteristic. The sonic character transformation module may include a memory module for storing a program by a user for shaping the sound characteristic.

In one embodiment shown and described below, the sonic character transformation module may include in combination an analog-to-digital converter for converting an analog audio signal into a digital audio input signal; the sound shaping digital signal processor for transforming the sonic character of the digital audio input signal; and a digital-to-analog converter for converting the digital audio input signal into the sonic character transformation module signal.

The sonic character transformation module and FM transmitter module may be packaged as a single portable unit with an instruction sheet for configuring or using the same.

In one embodiment, the sonic character transformation module is a modeling pre-amp module coupled to the transmitter module. The modeling/DSP pre-amp module is connected to an audio/instrument source.

The modeling/DSP pre-amp module amplifies and effects an audio input signal received from an audio/instrument source and provides a pre-amplified audio input signal to the transmitter module.

The transmitter module receives the pre-amplified audio input signal and transmits it to the receiver module on a given frequency.

Moreover, the present invention also provides an FM-Jam kit, which can be purchased as a complete package off-the-shelf, featuring an FM-Jam device as described above in combination with the instruction sheet having a set of instructions for configuring and using the FM-Jam device. The unit may be battery operated or be plugged into a standard wall socket with a AC/DC converter or the like.

One advantage of this new and unique FM-Jam device or kit is that, because all of these modules or devices operate on lightweight batteries, it allows an individual the freedom to play, for example, an electric instrument anywhere there is an FM-receiver available whether it be a camping trip, the beach, etc. The FM-Jam device or kit is also a great alternative for the novice guitarist who might opt for this system in lieu of a more expensive conventional amplifier.

DETAILED DESCRIPTION OF INVENTION

Figure 1:
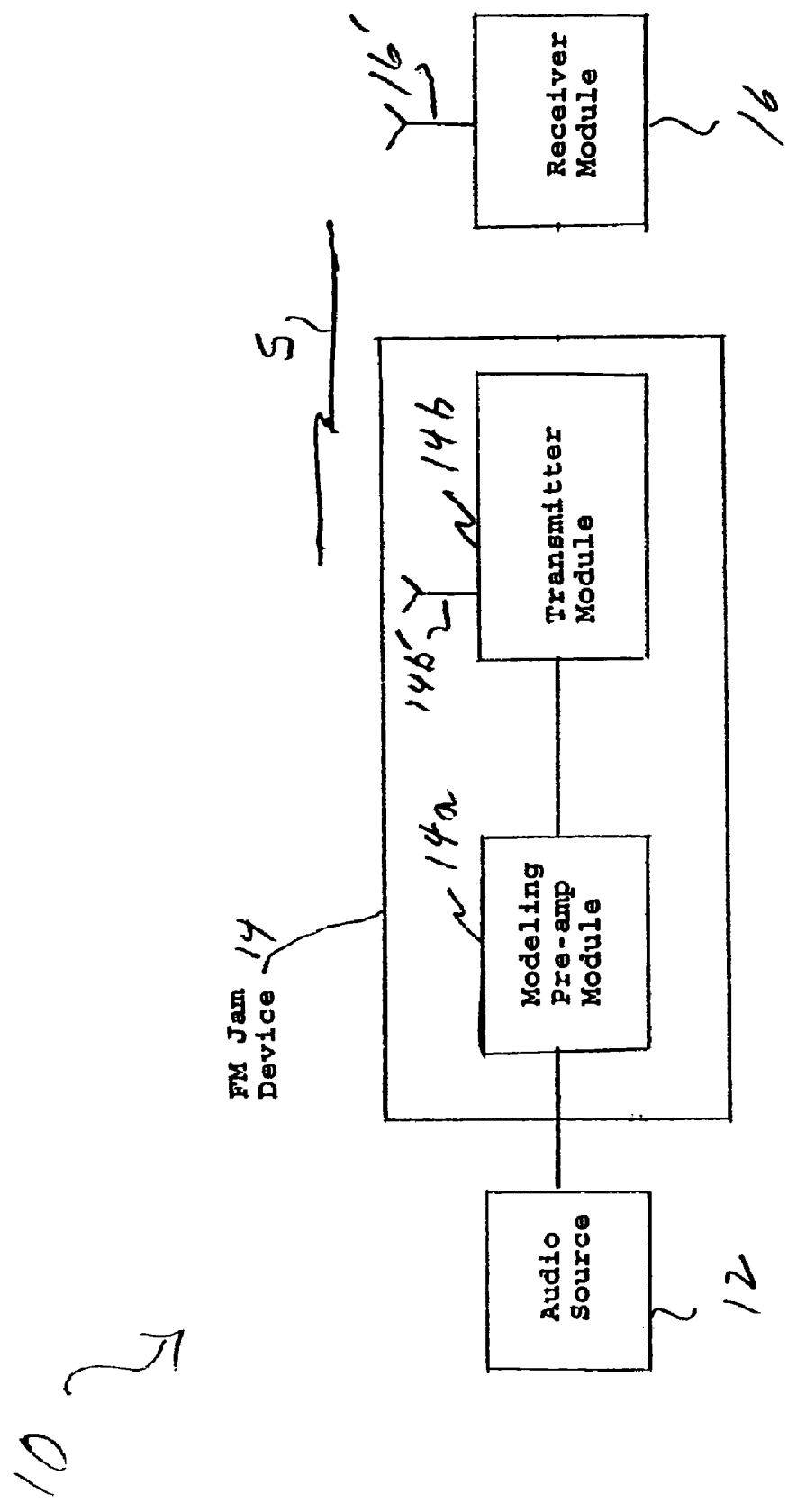
FIG. 1 shows an FM-Jam device according to the present invention.

FIG. 1: The FM-Jam Device

FIG. 1 shows the present invention in the form of an audio system generally indicated as 10 having an audio source 12, an FM-Jam device 14 and a receiver module 16.

The audio source 12 may be a guitar, keyboard (electric piano, synthesizer, etc.) or microphone (or any other device outfitted with any variety of transducers). The scope of the invention is not intended to be limited to any particular audio source now known or later developed.

The FM-Jam device 14, which is the subject matter of this invention, comprises a Modeling/Digital Signal Processor pre-amp module 14a and a transmitter module 14b.

The Modeling/Digital Signal Processor pre-amp module 14a is connected to the audio source 12 for receiving an audio input signal. The Modeling/Digital Signal Processor pre-amp module 14a amplifies the receiving audio input signal and provides a pre-amplified audio input signal to the transmitter module 14. As discussed below, the modeling pre-amp module 14a may be a circuit for a digital modeling/DSP pre-amp or other audio pre-amps. Circuits for digital modeling pre-amplification and audio pre-amplification are known in the art, and the scope of the invention is not intended to be limited to any particular type or kind thereof.

The transmitter module 14b receives the pre-amplified audio input signal from the receiver module 14a and transmits this signal via an antenna 14b'. The transmitted signal is indicated by reference label S. As discussed below, the transmitter module 14b may be an FM transmitter module that transmits the pre-amplified audio input signal on a given FM frequency. Circuits for transmitting a signal, including a signal on an FM frequency, are known in the art, and the scope of the invention is not intended to be limited to any particular type or kind thereof.

The receiver module 16 receives the transmitted the pre-amplified audio signal via an antenna 16' and plays the music on its speakers (not shows). The receiver module 16 may be a boom-box, a car stereo, a home stereo, etc.). The scope of the invention is not intended to be limited to any particular receiver now known or later developed. In operation, the transmitter module 14b and the receiver module 16 must be set to the same frequency, and the frequency should preferably be set to a radio station having a weak radio broadcast or no broadcast at all.

Figure 2:
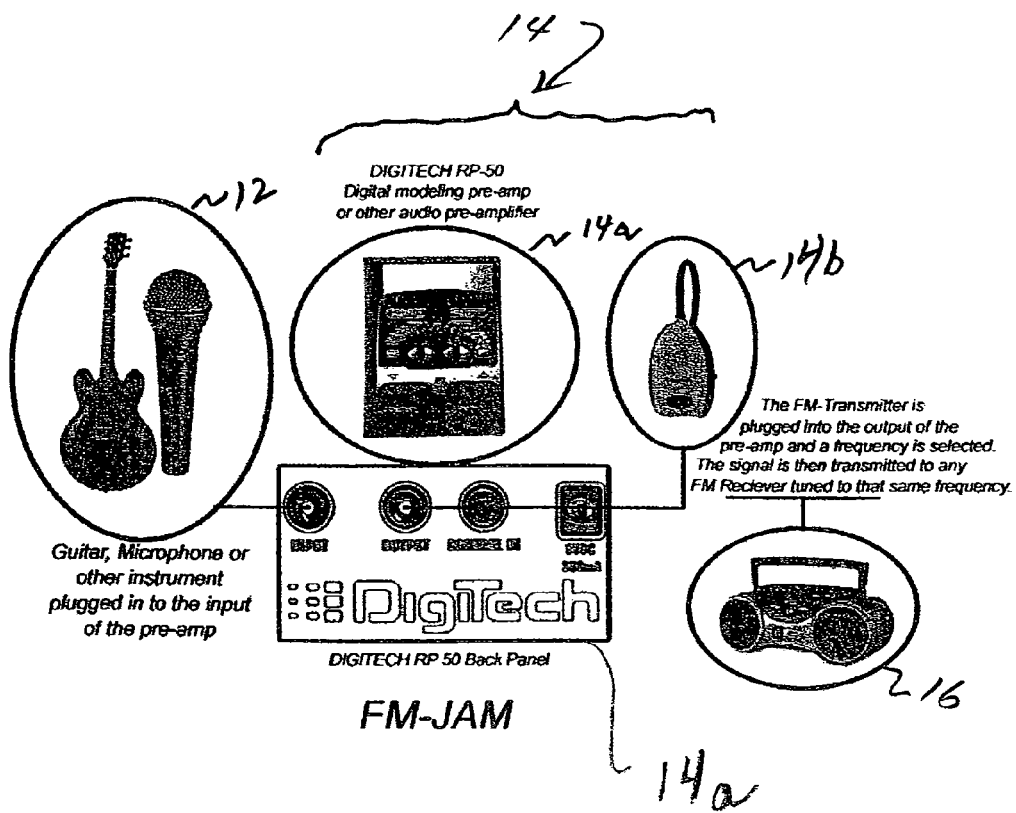
FIG. 2 shows an FM-Jam kit after it is configured in accordance with instructions provided herein.

FIG. 2: The FM-JAM Kit

FIG. 2 shows the present invention in the form of an FM-JAM kit having a combination of two known off-the-shelf audio devices that when used together create a portable, go anywhere solution for amplifying and effecting the guitar, keyboard (electric piano, synthesizer, etc.) or microphone (or any other device outfitted with any variety of transducers) and then broadcasting that signal to any FM receiver (boom-box, car stereo, home stereo, etc.) located within a given distance, such as 20', of the transmitter. Elements having similar functionality in FIGS. 1-2 are labelled with similar reference numerals.

The two off-the-shelf pieces that make up the FM-jam kit may include the following:
1) A Digital Modeling/Digital Signal Processor pre-amp (Digitech RP-50, Zoom 505, Korg Pandora's Box, etc.); and
2) An FM-Transmitter (KIMA Link-It, Arielle Audio Bug, etc.).

It is important to note that the scope of the invention is not intended to be limited to any particular modeling/Digital Signal Processor pre-amp/audio pre-amp, or FM-Transmitter, or the type of audio source or receiver being used in combination therewith.

The FM-JAM Kit Instructions

The FM-JAM kit would be provided with an instruction sheet having the following instructions for configuring and using the audio system:
1. Plug a guitar/microphone or other instrument into the input of the digital modeling pre-amp using a standard instrument cable, such as a standard ¼" instrument cable.
2. Plug the FM-transmitter into the output of the digital modeling/audio pre-amp, using a standard instrument cable, such as a standard ¼" instrument cable.
3. Select one of several available frequencies on the FM-transmitter.
4. Set the FM receiver to that same frequency.
5. Control the FM receiver as one would a conventional guitar/instrument amplifier for receiving a desired audio result.

FIG. 3

Figure 3:
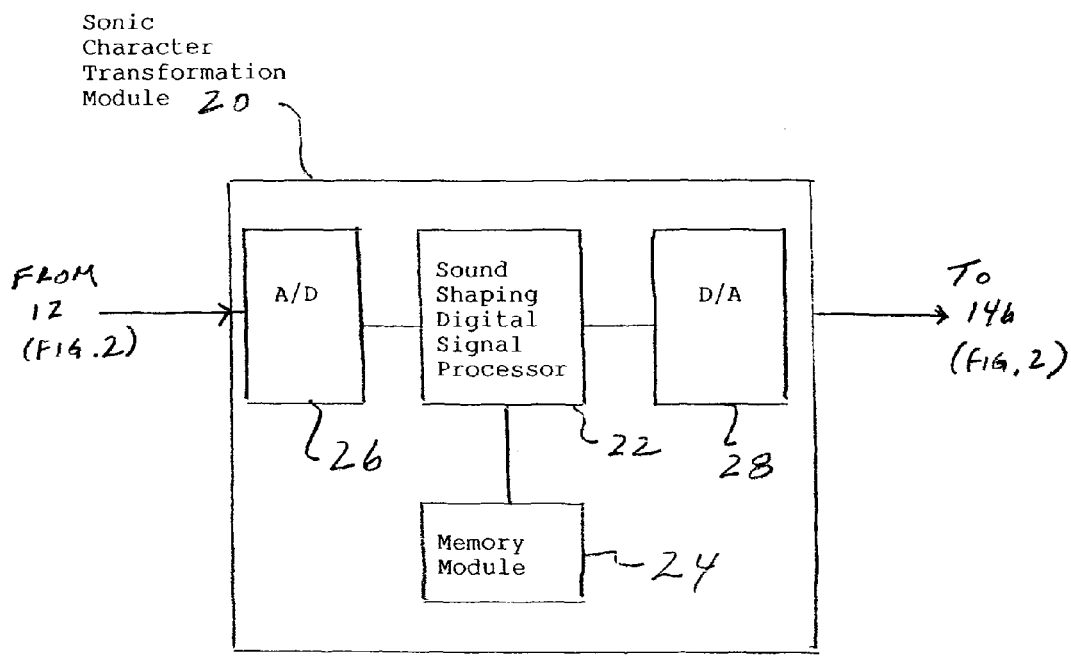
FIG. 3 shows a sonic character transformation module that forms part of an alternative embodiment of the present invention in its broadest sense.

FIG. 3 shows the present invention in its broadest sense, wherein the FM-Jam device features a sonic character transformation module generally indicated as 20, which may be used in combination with the FM transmitter module 14b shown in FIG. 1. The sonic character transformation module 20 responds to an audio input signal from an audio source, such as element 12 in FIG. 1. for providing a sonic character transformation module signal containing information about a transformation of the sonic character of the audio input signal, which is provided to an FM transmitter like element 14b in FIG. 1. The sonic character transformation module 20 includes a sound shaping digital signal processor 22 for providing some desired shaping of the sound characteristic of the audio input signal. The desired shaping may include modifying or adding either amplification, reverberation, equalization such as bass, midrange, treble, distortion, compression, vacuum tube modeling, overdrive and modulations such as chorusing, flanging, phasing etc. or some combination thereof of the audio input signal. The scope of the invention is also intended to include other types of sound shaping now known or later developed in the future. The sound shaping digital signal processor 22 may be programmable by the user for selectively providing the desired shaping of the sound characteristic. The sonic character transformation module 20 may include a memory module 24 for storing a program by a user for shaping the sound characteristic of the audio input signal.

The sound shaping digital signal processor 22, as well as any of the other modules described herein, may be implemented in whole or part using hardware, software, or a combination thereof. In a typical software implementation, the sound shaping digital signal processor 22 would be a microprocessor-based architecture having a microprocessor, a random access memory (RAM), a read only memory (ROM), input/output devices and control, data and address buses connecting the same. A person skilled in the art of programming would be able to program such a microprocessor-based implementation to perform the functionality described herein without undue experimentation.

The sonic character transformation module 20 also includes an analog-to-digital converter 26 for converting an analog audio signal into a digital audio input signal; and a digital-to-analog converter 28 for converting the digital audio input signal into the sonic character transformation module signal. Such analog-to-digital converters and digital-to-analog converter are known in the art, and the scope of the invention is not intended to be limited to any particular type or kind thereof.

FIG. 4

Figure 4:
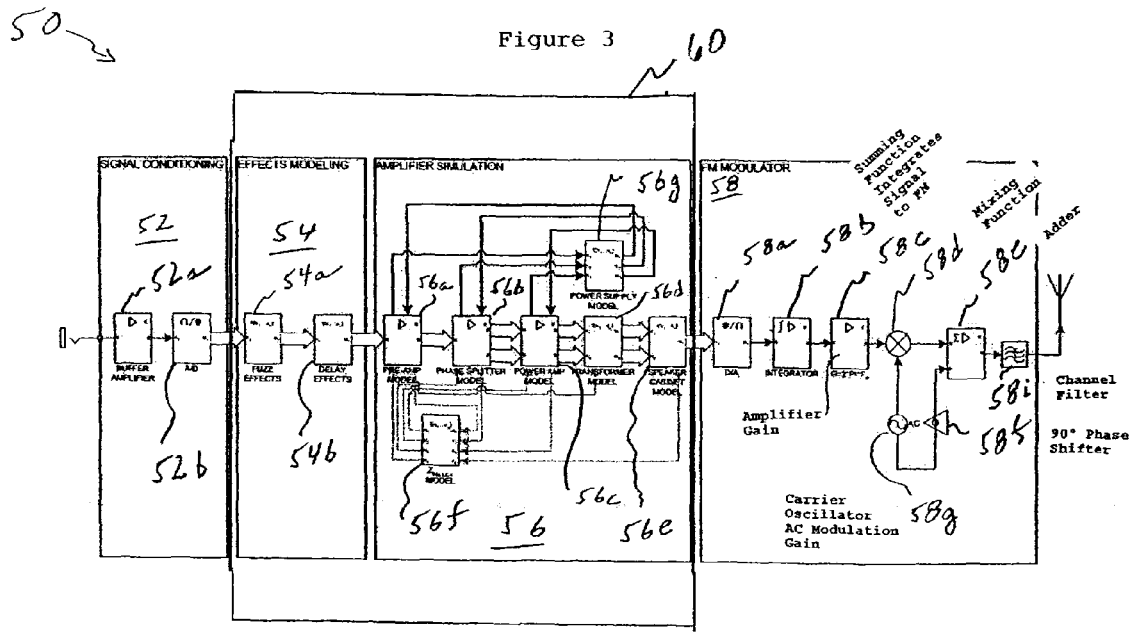
FIG. 4 shows an amplifier simulation of a sonic characteristic transformation module in relation to that shown in FIG. 3.

FIG. 4 shows an amplifier simulation generally indicated as 50 utilizing modelling technology coupled to an FM modulation block for low power broadcast and demodulation in the FM radio band, which includes a signal conditioning module 52, an effects modeling module 54, an amplifier simulation module 56 and an FM modulator module 58. The effects modeling module 54 and amplifier simulation module 56 together form a sound shaping digital signal processor module 60, similar to element 22 in FIG. 3.

The signal conditioning module 52 includes a buffer amplifier 52a and an A/D converter 52b, which together cooperate to perform the signal conditioning of the input signal, for providing a conditioned input signal.

In the sound shaping digital signal processor module 60, the effects modeling module 54 includes a fuzz effects module 54a and a delay effects module 54b, which cooperate to perform the effects modeling of the conditioned input signal, for providing an effects modeling output signal.

The amplifier simulation module 56 includes a pre-amp model module 56a, a phase splitter model module 56b, a power amp model module 56c, a transformer model module 56d, a speaker cabinet model module 56e, a $Z_{Miller}$ model module 56f and a power supply model module 56g, which together cooperate to perform the amplifier simulation of the effects modeling output signal. In operation, the amplifier simulation module 56 has two feedback circuit arrangements, including a first feedback arrangement having the pre-amp model module 56a, phase splitter model module 56b, power amp model module 56c that provide respective first modeling signals to the power supply model module 56g, which in turn provides respective power supply model module output signals back to the modules 56a, 56b, 56c. Similarly, a second feedback arrangement includes the pre-amp model module 56a, phase splitter model module 56b, power amp model module 56c and speaker cabinet model module 56e that provide respective second respective modeling signals to the $Z_{Miller}$ model module 56f, which in turn provides respective $Z_{Miller}$ model output signals back to the pre-amp model module 56a, phase splitter model module 56b, power amp model module 56c and transformer model module 56d. Together, the two feedback arrangements combine to provide the amplifier simulation on the effects modeling output signal in the sound shaping digital signal processor module 60.

The FM modulator module 58 includes a D/A module 58a, an integrator 58b (summing function integrates signal to FM), an amplifier gain (G=2*Pi*F) module 58c, a mixing function 58d, an adder module 58e, a 90° phase shifter 58f, a carrier oscillator AC modulation gain 58g and a channel filter 58i, which together cooperate to perform the FM modulation of the sound shaping digital signal processor module output signal from the module 60. As shown, the 90° phase shifter 58f and carrier oscillator AC modulation gain 58g are coupled between and respectively provide amplifier and source input signals to the mixing function 58d (multiplier) and the adder module 58e to effect the FM modulation process.

SCOPE OF THE INVENTION

As described above, the scope of the invention is intended to include an FM driven instrument/voice amplifier whether it be accomplished with one pre-amp and an FM-transmitter built into it or in the form of a kit having two separate units with an instruction sheet for configuring and using the same.

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:

1. An FM-Jam device, comprising:
    a modeling pre-amp module, configured for responding to an input signal containing information about a sonic character of an electrical signal originating from a musical instrument, including a guitar or keyboard, for shaping and modeling the sonic character of the electrical signal, and for providing a modeling pre-amp module signal containing information about the shaping and modeling of the sonic character of the electrical signal; and
    an FM transmitter module, configured for responding to the modeling pre-amp module signal, and for providing an FM transmitter output signal on a selected FM frequency for playing on an FM receiver, including a boombox, car stereo, or home stereo, containing information about the shaping and modeling of the sonic character of the electrical signal originating from the musical instrument.

2. An FM-Jam device according to claim 1, wherein the modeling pre-amp module includes a sound shaping digital signal processor for providing the shaping and modeling of the sonic character of the electrical signal.

3. An FM-Jam device according to claim 2, wherein the desired shaping and modeling includes modifying or adding either amplification, reverberation, equalization such as bass, midrange, treble, distortion, compression, vacuum tube modeling, overdrive and modulations, including chorusing, flanging, phasing, or some combination thereof.

4. An FM-Jam device according to claim 2, wherein the sound shaping digital signal processor is programmable by the user for selectively providing the desired shaping and modeling of the sonic character.

5. An FM-Jam device according to claim 2, wherein the sonic modeling pre-amp module includes a memory module for storing a program by a user for shaping and modeling of the sonic character.

6. An FM-Jam device according to claim 1, wherein the modeling pre-amp module is a digital modeling/signal processor preamp that shapes, models and amplifies the input signal.

7. An FM-Jam device according to claim 1, wherein the modeling pre-amp module includes:
    an analog-to-digital converter for converting an analog input signal into a digital input signal;
    a sound shaping digital signal processor for shaping and modeling the sonic character of the digital input signal; and
    a digital-to-analog converter for converting the digital input signal into the modeling pre-amp module signal.

8. An FM-Jam device according to claim 1, wherein the modeling pre-amp module and FM transmitter module are packaged as a single unit with an instruction sheet for configuring or using the FM-Jam device.

9. An FM-Jam device according to claim 1, wherein the FM transmitter module includes an antenna for transmitting the FM transmitter output signal.

10. An FM-Jam device according to claim 1, wherein the modeling pre-amp module has an input for plugging in a standard instrument cable connected to the musical instrument.

11. An FM-Jam kit, comprising:
    an FM-Jam device having
        a modeling pre-amp module, configured for responding to an input signal containing information about a sonic character of an electrical signal originating from a musical instrument, including a guitar or keyboard, for shaping the sonic character of the electrical signal, and for providing a modeling pre-amp module signal containing information about the modeling of the sonic character of the electrical signal; and an FM transmitter module, configured for responding to the modeling pre-amp signal, and for providing an FM transmitter output signal on a selected FM frequency for playing on an FM receiver, including a boom-box, car stereo, or home stereo, containing information about the shaping and modeling of the sonic character of the electrical signal originating from the musical instrument; and an instruction sheet having a set of instructions for configuring and using the FM-Jam device.

12. An FM-Jam kit according to claim 11, wherein the instruction sheet includes the following instructions:

plug a guitar/microphone or other instrument into the input of the digital modeling pre-amp using a standard instrument cable, including a standard ¼" instrument cable;

plug the FM-transmitter into the output of the digital modeling/audio pre-amp, using an instrument cable, including the standard ¼" instrument cable;

select one of several available frequencies on the FM-transmitter;

set the FM receiver to that same frequency; and control the FM receiver as one would a conventional guitar/instrument amplifier for receiving a desired audio result.

13. An FM-Jam kit according to claim 11, wherein the modeling pre-amp module includes a sound shaping digital signal processor for providing the shaping and modeling of the sonic character of the electrical signal.

14. An FM-Jam kit according to claim 13, wherein the desired shaping and modeling includes modifying or adding either amplification, reverberation, equalization such as bass, midrange, treble, distortion, vacuum tube modeling, overdrive and modulations, including chorusing, flanging, phasing or some combination thereof.

15. An FM-Jam device according to claim 13, wherein the sound shaping digital signal processor is programmable by the user for selectively providing the desired shaping and modeling of the sonic character.

16. An FM-Jam device according to claim 15, wherein the modeling pre-amp module includes a memory module for storing a program by a user for shaping and modeling of the sonic character.

17. An FM-Jam kit according to claim 11, wherein the modeling pre-amp module is a digital modeling preamp that shapes, models and amplifies the input signal.

18. An FM-Jam kit according to claim 11, wherein the modeling pre-amp module includes:

an analog-to-digital converter for converting an analog input signal into a digital input signal;

a sound shaping digital signal processor for shaping and modeling the sonic character of the digital input signal; and a digital-to-analog converter for converting the digital input signal into the modeling pre-amp module signal.

19. An FM-Jam kit according to claim 11, wherein the modeling pre-amp module and FM transmitter module are packaged as a single unit with an instruction sheet for configuring or using the FM-Jam device.

20. An FM-Jam kit according to claim 11, wherein the FM transmitter module includes an antenna for transmitting the FM transmitter output signal.

* * * * *